United States Patent
Blandino et al.

(10) Patent No.: US 6,289,884 B1
(45) Date of Patent: Sep. 18, 2001

(54) INTAKE AIR SEPARATION SYSTEM FOR AN INTERNAL COMBUSTION ENGINE

(75) Inventors: Joseph A. Blandino, Peoria; Charles H. Dutart, Washington; Eric C. Fluga, Dunlap, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/595,397

(22) Filed: Jun. 14, 2000

(51) Int. Cl.$^7$ .................................................. F02B 23/00
(52) U.S. Cl. ............................................. 123/585; 60/274
(58) Field of Search ............................... 123/585; 60/274

(56) References Cited

U.S. PATENT DOCUMENTS

| | | |
|---|---|---|
| 2,444,222 | 6/1948 | Craig . |
| 3,489,144 | 1/1970 | Dibelius et al. . |
| 3,509,694 | 5/1970 | Imai et al. . |
| 3,602,202 | 8/1971 | Kobayashi . |
| 3,709,203 | 1/1973 | Cettin et al. . |
| 3,792,690 | 2/1974 | Cooper . |
| 3,817,232 | 6/1974 | Nakajima et al. . |
| 3,907,657 | 9/1975 | Heijne et al. . |
| 3,961,609 | 6/1976 | Gerry . |
| 3,977,365 | 8/1976 | Vierling et al. . |
| 3,980,053 | 9/1976 | Horvath . |
| 4,064,840 | 12/1977 | Vierling . |
| 4,351,302 | 9/1982 | Brettler . |
| 4,361,474 | 11/1982 | Shoaf et al. . |
| 4,553,988 | 11/1985 | Shimizu et al. . |
| 4,844,719 | 7/1989 | Toyomoto et al. . |
| 5,051,113 | 9/1991 | Nemser . |
| 5,051,114 | 9/1991 | Nemser et al. . |
| 5,129,924 | 7/1992 | Schultz . |
| 5,400,746 | 3/1995 | Susa et al. . |
| 5,476,537 | 12/1995 | Yi et al. . |
| 5,517,978 | 5/1996 | Yi . |
| 5,526,641 | 6/1996 | Sekar et al. . |
| 5,553,591 | 9/1996 | Yi . |
| 5,640,845 | 6/1997 | Ng et al. . |
| 5,648,304 | 7/1997 | Mazanec et al. . |
| 5,649,517 | 7/1997 | Poola et al. . |
| 5,678,526 | 10/1997 | Cullen et al. . |
| 5,702,999 | 12/1997 | Mazanec et al. . |
| 5,718,194 | 2/1998 | Binion . |
| 5,761,903 | 6/1998 | Straka . |
| 5,788,748 | 8/1998 | Mazanec et al. . |

OTHER PUBLICATIONS

Membrane–Based Air Composition Control for Light–Duty Diesel Vehicles: A Benefit and Cost Assessment: Center for Transportation Research Argonne National Library: K. Stork and R. Poola, Oct. 1998.*

* cited by examiner

Primary Examiner—Noah P. Kamen
(74) Attorney, Agent, or Firm—Robert J. Hampsch

(57) ABSTRACT

A method and system for the intake air separation within an internal combustion engine is disclosed. The disclosed embodiments of the intake air separation system includes an intake air separation device adapted for separating the intake air into a flow of the oxygen enriched air and a flow of nitrogen enriched air; an intake air circuit adapted to deliver intake air to the air separation device, and a purge air circuit adapted to deliver a flow of sweep air or purge air to the intake air separation device to increase the effectiveness of the air separation. The intake air separation device includes a first outlet in fluid communication with the intake air separation device and adapted to receive a flow of the oxygen enriched air and purge air as well as a second outlet also in fluid communication with the intake air separation device and adapted to provide the glow of nitrogen enriched air to the intake manifold for use in the combustion process. Controlling the flow and/or temperature of the purge air through the air separation device controls the air intake system.

26 Claims, 6 Drawing Sheets

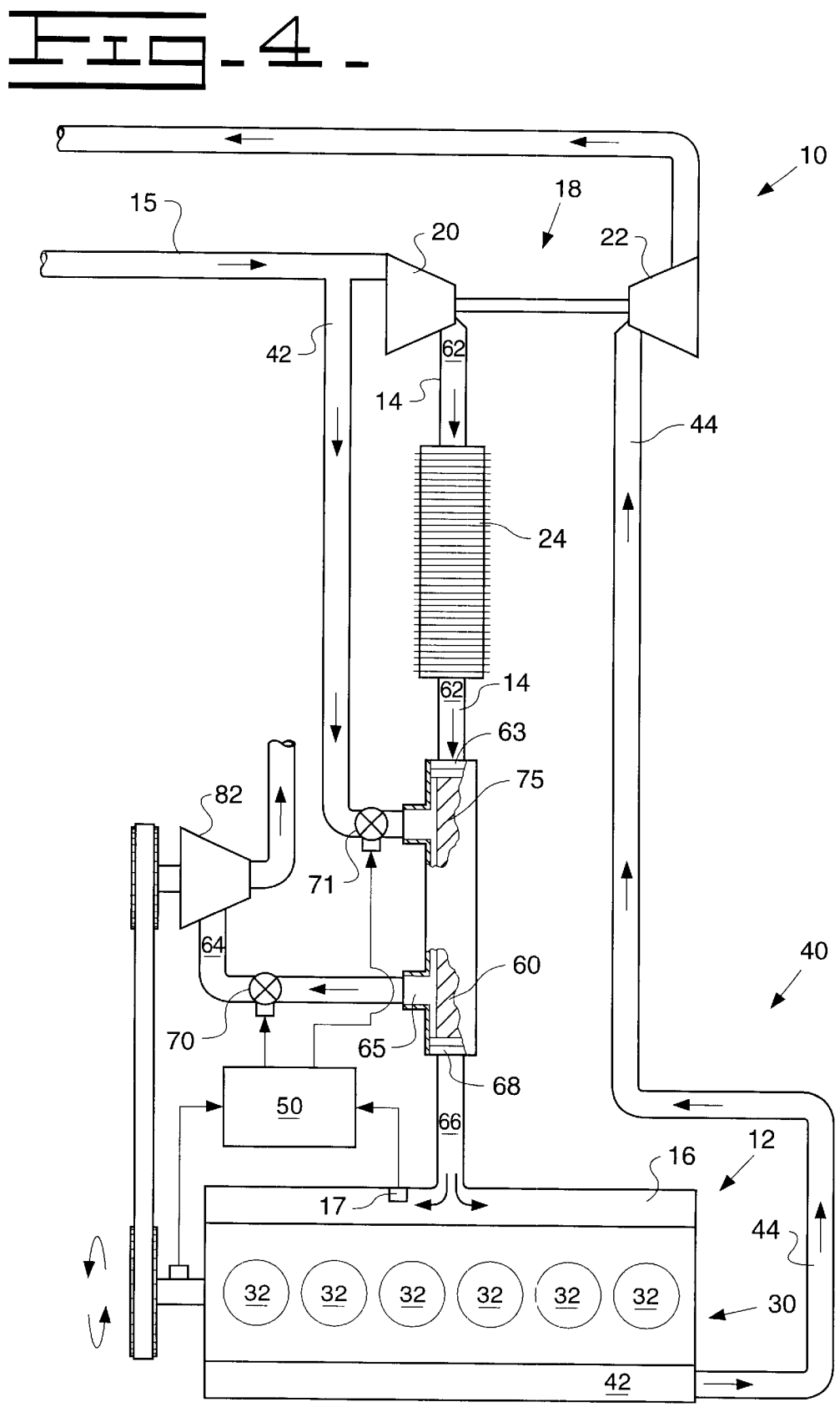
Fig-4-

INTAKE AIR SEPARATION SYSTEM FOR AN INTERNAL COMBUSTION ENGINE

TECHNICAL FIELD

The present invention relates to an intake air separation system for an internal combustion engine and more particularly, an intake air separation system that includes an air separation membrane adapted to produce a stream of oxygen enriched air and nitrogen enriched air from the intake air in the presence of a stream of purge air.

BACKGROUND ART

In recent years, internal combustion engine makers, and in particular diesel engine manufacturers, have been faced with ever increasing regulatory requirements, namely exhaust emissions regulations. Exhaust emissions takes on a number of forms including visible smoke, particulate matter and oxides of nitrogen (NOx). As is generally know in the art, particulate matter is comprised of mainly unburned hydrocarbons and soot whereas NOx is an uncertain mixture of oxides of nitrogen (mainly NO and some $NO_2$). To address these emissions issues, different technologies have been developed or used, including fuel injection and combustion control strategies and systems, after-treatment systems, exhaust gas recirculation (EGR) systems, and, in some cases intake air separation systems.

Many emission reduction systems have a negative effect on fuel efficiency, an issue that is of great importance to most users of diesel engines. One well-known method of improving engine fuel efficiency or power density is by increasing the amount of oxygen in the cylinder. Typically this has been accomplished by pressurizing the air taken into the combustion chamber. The main goal of this pressurization is to increase the oxygen available for combustion. Others have increased the concentration of oxygen in the combustion air using air separation techniques. See, for example, U.S. Pat. No. 5,649,517 (Poola et al.) issued on Jul. 22, 1997 and U.S. Pat. No. 5,636,619 (Poola et al.) issued on Jun. 10, 1997 which disclose the use of a semi-permeable gas membrane on a portion of the intake air to reduce the nitrogen content from the intake air flow to create an oxygen enriched air supply for combustion purposes. The '517 patent also discloses potential uses for the nitrogen enriched air stream exiting the air separation device. Another related art disclosure of interest is U.S. Pat. No. 5,553,591 (Yi) issued to on Sep. 10, 1996 which shows a vortex air separation system for creating oxygen enriched intake air to increase the power generated during combustion. Still other related art systems employing oxygen enrichment are disclosed in U.S. Pat. No. 5,400,746 (Susa et al.) issued on Mar. 28, 1995 and U.S. Pat. No. 5,678,526 issued on Oct. 21, 1997. See also U.S. Pat. Nos. 5,051,113 and 5,051,114 (Nesmer et al.)

It is well known that the introduction of oxygen enriched intake air during the intake stroke of facilitates burning a larger part of the available fuel injected which in turn increases the power output for each combustion cycle or charge, and generally reduces brake specific fuel consumption (BSFC). Lower BSFC correlates strongly with reduction in unburned fuel and overall improvement in fuel economy.

Other related art disclosures include U.S. Pat. No. 5,526,641 (Sekar et al.) and U.S. Pat. No. 5,640,845 (Ng et al.) which disclose similar air separation techniques for creating oxygen enriched air as well as nitrogen enriched air specifically for after-treatment purposes. Utilization of an air separation system has also been tried for the purpose of reducing emissions such as particulates and NOx. See K. Stork and R. Poola publication "Membrane-Based Air Composition Control for Light Duty Diesel Vehicles" (October 19998). Most particulates generated during the combustion cycle form relatively early in the combustion cycle, but such early forming particulates usually burn as temperature and pressure increase during the combustion cycle. The particulates that typically enter the exhaust stream tend to form in the latter part of the combustion cycle as the pressure and temperature decreases. In addition to decreasing BSFC, increasing air intake oxygen content serves to reduce the quantity of unburned hydrocarbons by increasing the likelihood of complete combustion.

After-treatment of exhaust gas is useful in reducing the amount of unburned hydrocarbons. After-treatment methods take steps to continue the oxidation of the unburned hydrocarbons. One manner is by introducing a secondary air supply into the exhaust stream. This secondary air stream provides more oxygen to the already high temperature exhaust ensuring further oxidation. While using secondary air is effective in eliminating particulates, the further oxidation creates still higher temperatures in the exhaust system. Designing the exhaust system for these higher temperatures requires components able to withstand the hotter environment. These components often times are heavier, expensive or require more frequent servicing.

While particulate production generally decreases along with fuel consumption, NOx production generally increases. NOx forms where nitrogen mixes in a high temperature setting with excess oxygen not used in the combustion process. Thus, while excess oxygen and high combustion temperatures are beneficial in reducing fuel consumption, such combination is detrimental in terms of increased NOx formation. This conflict generally leads engine manufacturers to delicately balance NOx production with brake specific fuel consumption (BSFC) and particulate matter in order to meet emission regulations. The present invention resolves, at least in part, the continuing conflict between reducing particulates, reducing NOx, and decreasing BSFC.

Exhaust Gas Recirculation (EGR) is one technique currently in use to reduce NOx formation within the combustion cylinder. EGR reduces the amount of available oxygen for formation of NOx. By reducing the amount of oxygen, the combustion process is also slowed thereby reducing the peak temperatures in the combustion chamber. EGR systems typically use exhaust gas, however the '517 patent (Poola et al.) shows using an enriched nitrogen source extracted from a portion of the intake air instead of recirculated exhaust gas to displace oxygen in the combustion chamber. See also K. Stork and R. Poola publication "Membrane-Based Air Composition Control for Light Duty Diesel Vehicles" (October 1998). The enriched nitrogen air is both cleaner and cooler than exhaust gas, and thus provides distinct advantages over exhaust gas recirculation.

From the above discussion it appears well known that oxygen enriched air and nitrogen enriched air have a number of beneficial uses within an internal combustion engine and a diesel engine in particular. What is needed therefor are various improvements to the existing air separation systems so that such systems are useful in a heavy-duty diesel engine or similar such application. More importantly, what is needed are improvements to such existing air separation systems that provide reliable and durable designs of an intake air separation system and that effectively balances the fuel consumption requirements and emissions. Such a system should be simple and relatively inexpensive to manufacture, install, operate and maintain. The present invention is directed at overcoming one or more of the problems set forth above.

DISCLOSURE OF THE INVENTION

The present invention may be characterized as a method and system for intake air separation within an internal combustion engine. The intake air separation system includes an intake air inlet adapted to receive the intake air used in the combustion process for the engine and an intake air separation device in flow communication with the intake air inlet. The intake air separation device, preferably an air separation membrane, is adapted for separating the intake air into a flow of the oxygen enriched air and a flow of nitrogen enriched air. In addition, the disclosed air intake system includes a purge air circuit in fluid communication with the intake air separation device and adapted for providing a source of purge air to the intake air separation device to increase the efficiency of intake air separation. Finally, the intake air separation system includes a first outlet in fluid communication with the intake air separation device and adapted to receive the flow of the oxygen enriched air and purge air as well as a second outlet also in fluid communication with the intake air separation device and adapted to provide the flow of the nitrogen enriched air to the intake manifold for use in the combustion process. In the disclosed embodiments, controlling the pressure or temperature of the purge air through the air separation device controls the air intake system.

The invention may also be characterized as a method of controlling the intake airflow in an internal combustion engine. The method preferably comprises the steps of: (a) directing the intake air to an intake air separating device; (b) directing a flow of purge air to the intake air separating device; (c) separating the intake air into a flow of oxygen enriched air and a flow of nitrogen enriched air; (d) directing the nitrogen enriched air to the intake manifold; and (e) controlling the nitrogen content of the air directed to the intake manifold by controlling flow of purge air in response to selected engine operating conditions.

As with the above-described intake air separating system, the disclosed method of controlling intake airflow in an engine involves passing intake air through a selectively permeable membrane adapted for separating the intake air and producing controlled flows of oxygen enriched air at a first outlet and nitrogen enriched air at a second outlet.

BRIEF DESCRIPTION OF THE DRAWINGS

The above and other aspects, features and advantages of the present invention will be more apparent from the following more particular description thereof, presented in conjunction with the following drawings. Certain features and elements illustrated in the drawings may be repositioned and certain dimensions and relative sizes may be exaggerated to better explain the invention.

FIG. 4 depicts a schematic diagram of still another embodiment of the present intake air separation system.

Corresponding reference numbers indicate corresponding components in the various embodiments illustrated in the drawings.

BEST MODE FOR CARRYING OUT THE INVENTION

The following description includes the best mode presently contemplated for carrying out the invention. This description is not to be taken in a limiting sense but is made merely for the purpose of describing the general principals of the invention. The scope and breadth of the invention should be determined with reference to the claims.

Figure 1:
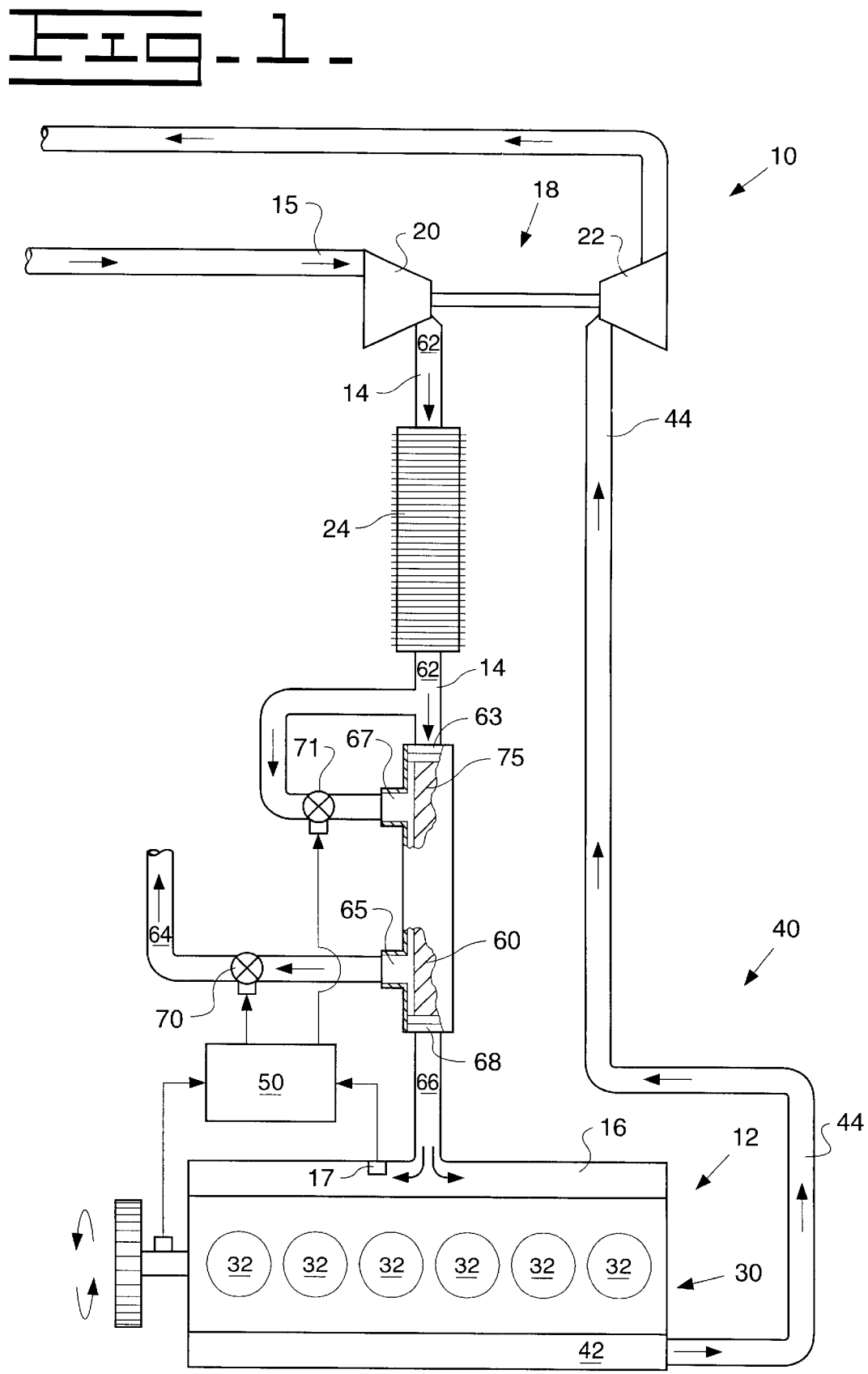
FIG. 1 depicts a schematic diagram of an internal combustion engine incorporating the intake air separation system in accordance with the present invention.

Turning now to the drawings and particularly FIG. 1, there is shown a schematic diagram of an intake air separation system 10 for a heavy-duty diesel engine 12. The intake side of the diesel engine 12 includes an intake air conduit 14, an intake manifold 16, intake air pressurizing device 18 (e.g. turbocharger), and an inter-cooler or an air to air aftercooler (ATAAC) 24. The engine 12 also includes a main combustion section 30, and an exhaust system 40. Although not shown in great detail, the typical main combustion section 30 includes, among other elements, an engine block and a cylinder head forming a plurality of combustion cylinders 32 therein. Associated with each of the cylinders 32 is a fuel injector, a cylinder liner, at least one air intake port and corresponding intake valves, at least one exhaust gas port and corresponding exhaust valves, and a reciprocating piston moveable within each cylinder to define, in conjunction with the cylinder liner and cylinder head, the combustion chamber. The exhaust system 40 of the diesel engine 12 includes an exhaust manifold 42 or split exhaust manifolds, one or more exhaust conduits 44, and an exhaust gas driven turbine 22, which drives the intake air compressor 20. Optionally, the exhaust system 40 may include one or more aftertreatment devices (not shown) such as particulate traps, NOx adsorbers, oxidation and/or lean NOx catalysts, or other recent advances in exhaust gas aftertreatment. Finally, the engine 12 includes an engine control module (ECM) 50 for operatively controlling the fuel injection timing and air system valve operations in response to one or more measured or sensed engine operating parameters, used as inputs to the ECM 50.

Although the present intake air separation system is shown and described with use on a heavy-duty six-cylinder, in-line, four stroke, direct injection diesel engine, numerous other engine types of engines, including alternate fuel engines, gasoline engines, natural gas engines, two stroke diesel engines, dual fuel engines, etc. are likewise contemplated as suitable engine platforms with which the disclosed invention may be used. In addition, the engine platform may come in a number of different engine configurations including "in-line" and "V" type engines and further having various numbers of cylinders.

As seen in FIG. 1, the intake air conduit 14 is in flow communication with intake air input 15, the compressor 20 of the exhaust gas driven turbocharger 18, and the ATAAC 24. Although the intake air separation system is shown and described in conjunction with a conventional turbocharged diesel engine, the disclosed system is equally useful on engines with a variable geometry turbocharger (VGT) or other supercharged engines, including engines with pressure wave supercharging devices. The intake manifold 16 is connected to an end of the intake air conduit 14. An inlet pressure sensor 17 is shown located somewhere in the intake air system (i.e. shown proximate the intake manifold 16) and provides intake air pressure data to the ECM 50. Other sensors such as temperature sensors, oxygen sensors (not shown) may also be incorporated within the intake air system and likewise coupled as inputs to the ECM 50. In addition, various other devices such as filters, valves, actuators, bypass conduits, etc., although not shown, may also be incorporated within the intake air system. Any such electronically operative components such as valves and/or actuators are preferably operatively coupled to the ECM 50 and operate in response to selected engine operating parameters or conditions, including engine speed, engine load, boost pressure conditions, etc.

Figure 3:
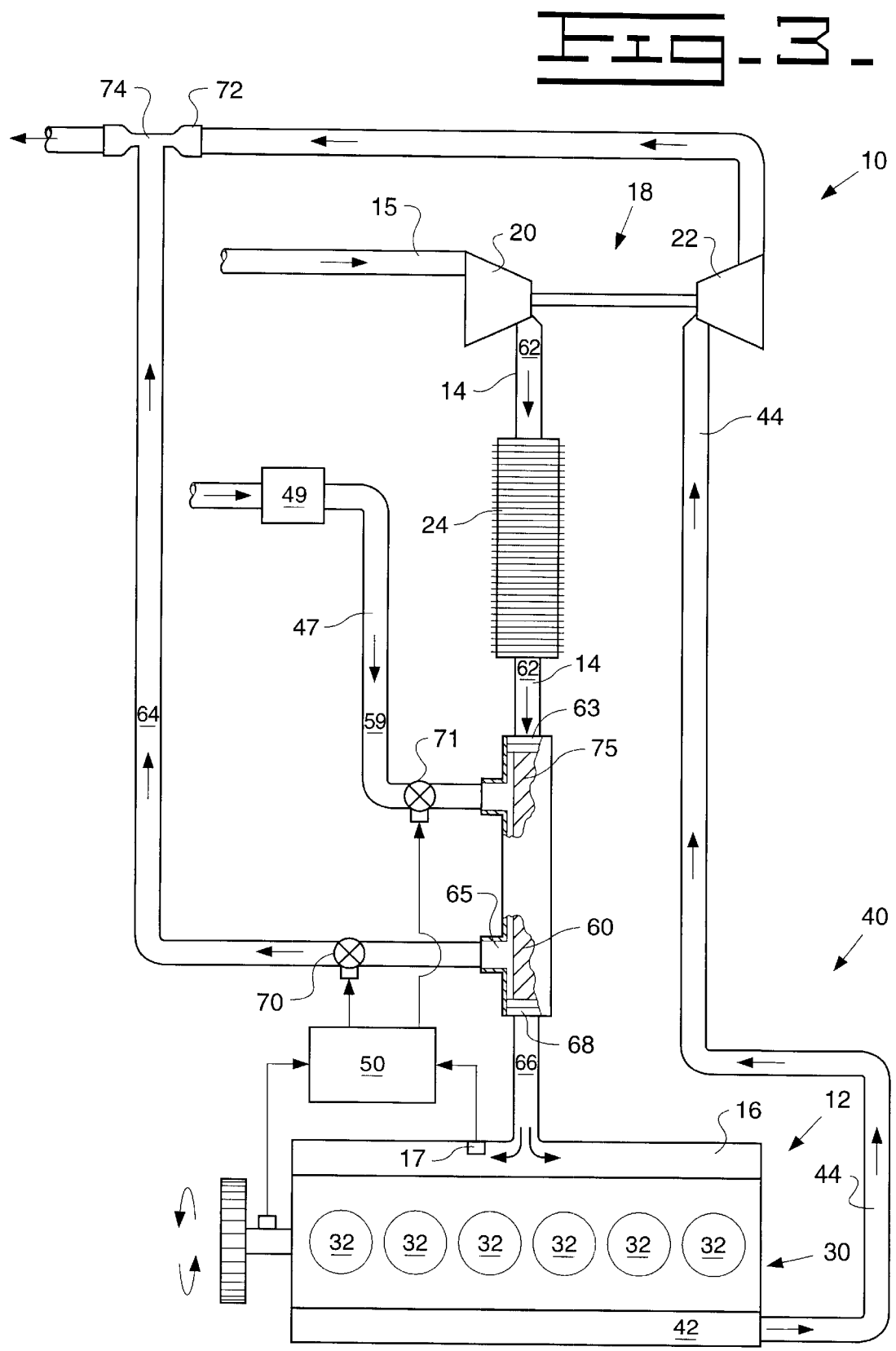
FIG. 3 depicts a schematic diagram of an alternate embodiment of the an intake air separation system.

The illustrated intake air separation system 10 includes an intake air separation device 60 disposed within the intake air system of the engine 12. Unlike the prior art air separation systems, the intake air separation device 60 is adapted for receiving substantially all of the engine combustion air at an air separation device inlet 63 and separating the same into a flow 64 of oxygen enriched air, which is combined with any purge air or sweep air present within the air separation housing, and a flow 66 of nitrogen enriched air. The illustrated intake air separation device 60 includes two inlets and two outlets. The first inlet is the intake air inlet 63 that receives the air to be separated into an oxygen rich stream and a nitrogen rich stream. The second inlet is a purge air inlet 67 that is adapted to receive a flow of sweep air or purge air 59 which enhances the permeation effectiveness of the air separation device 60. As illustrated in FIG. 1, the purge air 59 may be taken from the boosted, cooled intake air circuit. Alternatively, the purge air 59 may be a separate flow of filtered ambient air as shown in FIG. 3 or even a re-directed flow from the retentate outlet. The first outlet, or permeate outlet 65 of the air separation device 60 is adapted to receive the permeate flow 64 of oxygen enriched air combined with purge air.

The second outlet, or retentate outlet 68 is adapted to receive the retentate flow 66 of nitrogen enriched air. In the illustrated embodiments, the air separation device is a full flow separation unit and thus, there is no need for subsequent mixing of the nitrogen enriched air flow exiting the retentate outlet with more intake air. The second outlet or retentate outlet 68 is further in flow communication with the intake manifold 16 of the engine 12. As seen in FIG. 1, a flow control device or proportional valve 70 is preferably disposed proximate the first outlet or permeate outlet 65. The flow control device 70 is preferably actuated in response to signals received from ECM 50 which controls the permeate flow 64 away from the intake air separation device 60, and thereby controls the flow from the retentate outlet 68 to the engine intake manifold 16. In other words, the valve 70 located proximate the permeate flow outlet 66 controls both the permeate flow 64 (purge air and oxygen enriched air) away from intake air separation device 60 and thus controls the relative concentrations of nitrogen and oxygen in the air directed to the intake manifold 16 and to the combustion cylinders 32.

The location of the valve 70 is preferably at or proximate to permeate outlet 65 of the separation device housing or shell. Such an arrangement aids the responsiveness of the engine based on a relatively fast change in oxygen and nitrogen content of the air exiting the retentate outlet 68 into the intake manifold when the valve 70 is actuated (e.g. opened or closed) during transient operating conditions. Selective operation of the valve 70 allows the engine to operate in essentially three different charge air modes, namely nitrogen enriched mode (i.e. valve partially or fully open), standard intake air mode (i.e. valve closed for selected length of time), and transient oxygen enriched mode, which occurs for a short period or duration as the valve 70 is first closed. The exact location of the valve 70 is preferably optimized to take advantage of the different modes of charge air, and in particular the transient charge of oxygen enriched air that occurs when the valve 70 is first closed.

As seen in FIG. 1, the intake air separation device 60 preferably uses a plurality of selectively permeable separation membranes 75 that separates ambient intake air into streams of oxygen enriched air and nitrogen enriched air. Such membranes 75 are well known in the art, as evidenced by the disclosures in U.S. Pat. No. 5,649,517 (Poola et al.); U.S. Pat. No. 5,526,641 (Sekar et al.); U.S. Pat. No. 5,640, 845 (Ng et al.); and U.S. Pat. No. 5,147,417 (Nemser). See also K. Stork and R. Poola publication "Membrane-Based Air Composition Control for Light Duty Diesel Vehicles" (October 19998) for a discussion on membrane materials and fabrication.

Figure 2:
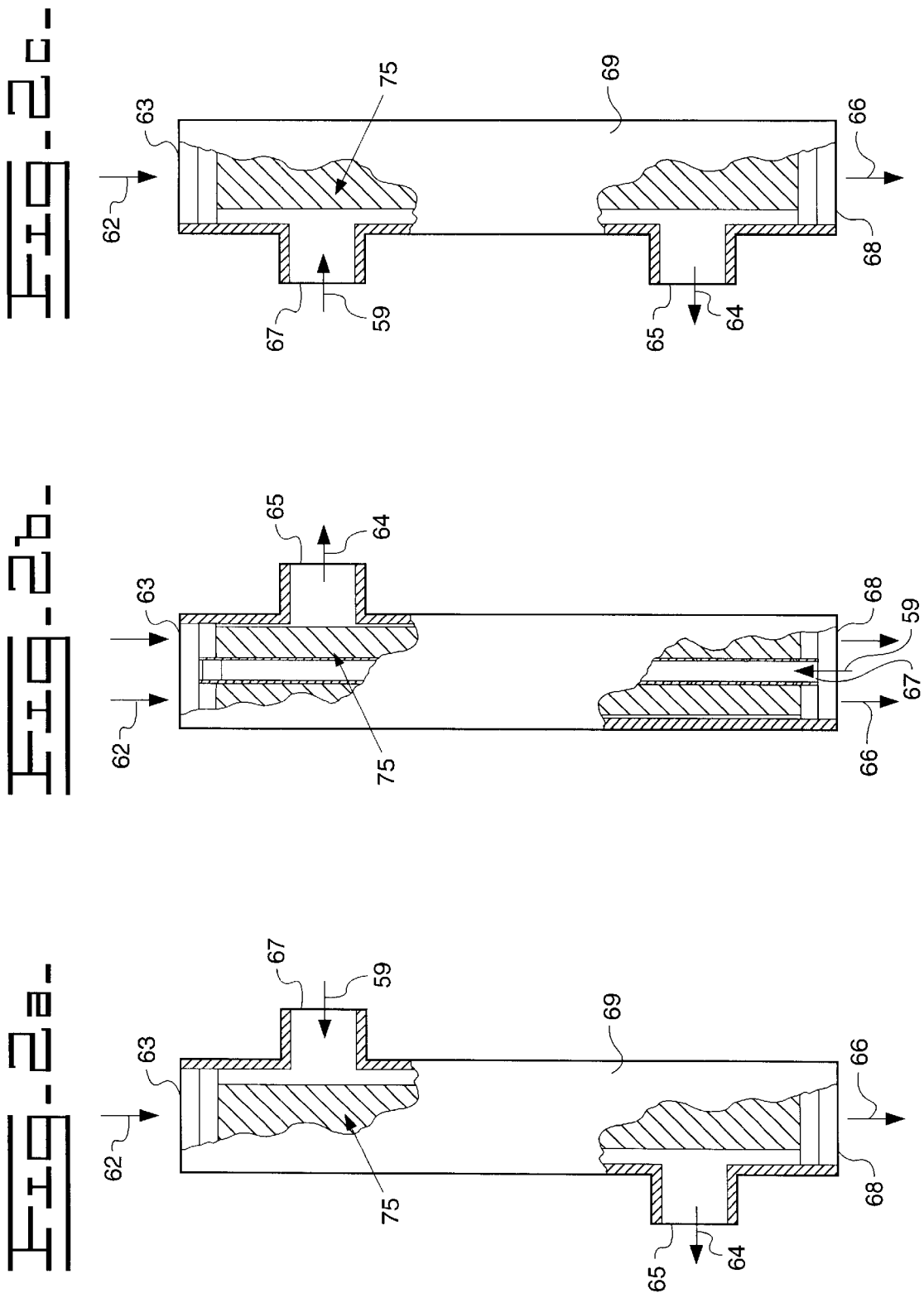
FIGS. 2a, 2b and 2c depict partial cut-away diagrams of the air separation devices contemplated for use in the disclosed embodiments of the present intake air separation system.

Turning for a moment to FIGS. 2a and 2c, there are shown two embodiments of the air separation membrane device 60. As seen therein, the air separation device includes a housing or shell 69, having an intake air inlet 63, and a purge air inlet 67, a permeate outlet 65, and a retentate outlet 68. A plurality of selectively permeable membrane elements or fibers are disposed in a general longitudinal or helical (i.e. spiral) orientation within the housing and potted or sealed at each end. The air separation membranes 75 are preferably hollow, porous, coated tubes through which selected gases such as hydrogen, helium, water vapors, carbon dioxide, and oxygen tend to permeate outwardly through the membrane at a relatively fast rate while other gases, such as carbon monoxide, argon and nitrogen permeate less rapidly and are mostly retained and transported along the membrane tubes. Different gases present in the intake or feed air 59 tend to permeate through the membrane at different relative permeation rates and generally through the side walls of the membrane. The rate of permeation is also dependent, in part, on the membrane temperature, and therefore, altering or controlling the temperatures of gases entering the air separation device ultimately controls permeability.

The intake air is introduced into the intake air separation housing 69 and air separation membrane in an orientation or direction that is generally along the length of the membranes 75. In this manner the intake air 59 is transported or flows generally along the length of the air separation unit. Conversely, the flow of purge air 59 is introduced into the air separation housing 69 and air separation membrane in a cross flow orientation or direction such that the purge air flows generally across the outer surfaces of the membrane. The purge air then exits the air separation housing 69 via the permeate outlet 65 as part of the permeate flow 64 and together with the permeated oxygen rich air. The retentate flow 66 of nitrogen rich air, exits from the air separation housing 69 via retentate outlet 68.

FIG. 2b shows an alternate embodiment of the air separation membrane device 60. As with the embodiment of FIG. 2a, the air separation device 60 of FIG. 2b also includes a cylindrical housing 69, a plurality of selectively permeable membranes 75, an intake air inlet 63, a purge air or sweep air inlet 67, a permeate/purge outlet 65, and a retentate outlet 68. However, the embodiment of FIG. 2b illustrates a different flow orientation that includes a central purge air conduit 55 through which the purge air flows into the separation device and a plug 57, which forces the sweep air or purge air flow 59 outwardly across the membranes 75 and exits via permeate outlet 65. FIGS. 2a and 2b illustrate mere examples of sweep or purge air flow configurations that produce good separation results, although various other flow configurations can also be employed. The various purge flow configurations offer differences in separation performance and packaging issues and can be tailored to the specific application in which the air separation device is used.

Referring back to the embodiment shown in FIG. 1, the compressor 20 of the turbocharger 18 is used to forcibly move intake air through the membrane-based intake air separation device 60, in what is often referred to as the pressure mode. Likewise, the purge air flow 59 is received or diverted from the flow of boosted, cooled intake air and delivered to the purge air inlet 65. If diverted, a simple purge air valve operatively coupled to the ECM may be used to control the purge air flow at various operating conditions. Thus, the purge air 59 and the intake air 62 are typically pressurized while the permeate flow 64 of oxygen enriched air flow and purge air exiting the air separation device 60 is preferably at a somewhat lower pressure, due to pressure losses incurred by flowing through the air separation device 60. This pressure gradient across the membrane 75 enables air separation to occur. As illustrated, the permeate flow 64 is preferably vented to the atmosphere or otherwise fed to other parts of the engine system, including, but not limited to the exhaust system 40. The retentate flow 66 or nitrogen enriched air flow is fed to the intake manifold 16 in a generally pressurized condition, albeit at a lower pressure than the feed or intake air pressure due to losses caused by the membrane based air separation device 60.

In certain light load operational environments, it may be necessary or desirable to provide an auxiliary force to drive the oxygen enriched air flow and purge air 66 from the air separation device 60. Conversely, in certain high load and/or transient load conditions, the oxygen demand of the engine 12 may warrant disabling the air separation effect. To accommodate these variations in flow requirements at different engine load conditions, the intake air separation system 10 may include a purge air driver (See FIGS. 3,4,5a, and 5b) to drive the purge air to or from the intake air separation device 60. Also, the intake air separation system 10 may include one or more air flow proportional valves 70, 71 to restrict the purge air to and/or permeate flow 66 away from the air separation system 10, or both.

For example, an embodiment of the intake air separation system 10 shown in FIG. 3, provides an auxiliary drive force or purge air driver may include a venturi element 72 placed in fluid communication with the permeate outlet 65 such that the flow of oxygen enriched air and purge air is forcibly drawn from the air separation device 60 to the throat 74 of the venturi element 72 via the permeate outlet 65 of the air separation device 60. As illustrated, the venturi element 72 can be placed in the exhaust stack or exhaust system 40 such that the flow of exhaust gases away from the engine 12 draws some or all of the oxygen enriched air and purge air away from the air separation device 60 for ultimate release to the atmosphere. Alternatively, one could design the air separation system to use an auxiliary flow that is present at or near the engine (e.g. steam, waterjet, etc.) to draw the permeate flow. This would be particularly useful in stationary engine applications, such as co-generation applications, or electric power generation applications.

In addition, the air intake separation system includes a purge air valve 71 disposed upstream of the air separation device for controlling the flow of purge air through the air separation device. FIG. 3 also illustrates an alternative embodiment of the purge air circuit. The shown purge air circuit includes a purge air conduit 47 and a filter device 49 for cleansing the purge air 59 prior to any introduction into the air separation device 60.

The auxiliary drive force or purge air driver may alternatively include a pump 82, supercharger or other such device that is mechanically driven by the power output of the engine 12, as shown in FIG. 4. Likewise, an existing auxiliary power devices such as the hydraulic fuel injection pump or power steering pump unit, etc. can be used to drive a blower in the purge air circuit. In the illustrated embodiment, the pump 82 or other device is preferably placed in flow communication with the permeate outlet 65 and is operated such that some or all of the flow 64 of oxygen enriched air and purge air is forcibly drawn via permeate outlet 65 for disposal or other unidentified uses. As with the prior embodiment, the purge air valve 71 is disposed upstream of the air separation device and, like the permeate valve 70, is controlled by the ECM 50 in response to one or more engine operating parameters or conditions, such as engine speed, engine load or intake pressure and intake or air separation device (i.e. membrane) temperature.

Figure 5A:
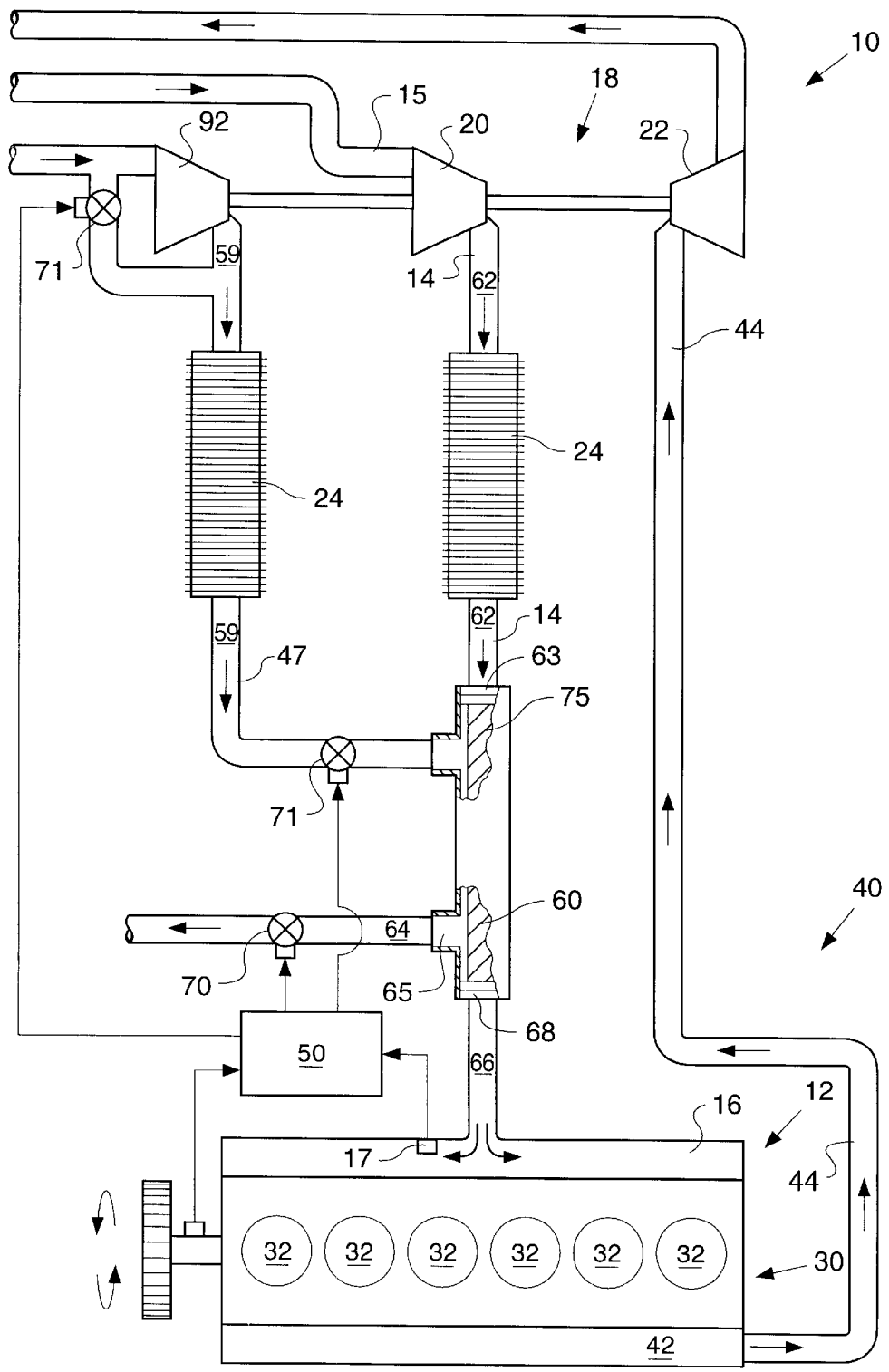
FIGS. 5a and 5b depict a schematic diagram of yet further embodiments of the present intake air separation system using a secondary compressor as the purge air driver.

Still another embodiment of the intake air separation system 10 shown in FIG. 5a, contemplates the use of an auxiliary drive force or purge air driver such as a purge air compressor 92 associated with the turbocharger 18 that is driven by the exhaust gas driven turbine 22. The purge air compressor 92 is disposed in flow communication with the purge air inlet 63 of the air separation device 60 so as to 'push' the purge air through the air separation device 60. Preferably, the purge air compressor 92 would be operatively controlled such that the flow of purge air, including amount and flow rate, is forcibly drawn to the air separation device 60 based on selected operating conditions. As illustrated in FIG. 5a, the purge air circuit also includes a secondary intercooler 24 or heat exchanger used to cool the compressed purge air as well as a purge air valve 71 operatively coupled to the ECM 50 for controlling the flow of purge air through the intake air separation system 10.

Figure 5B:
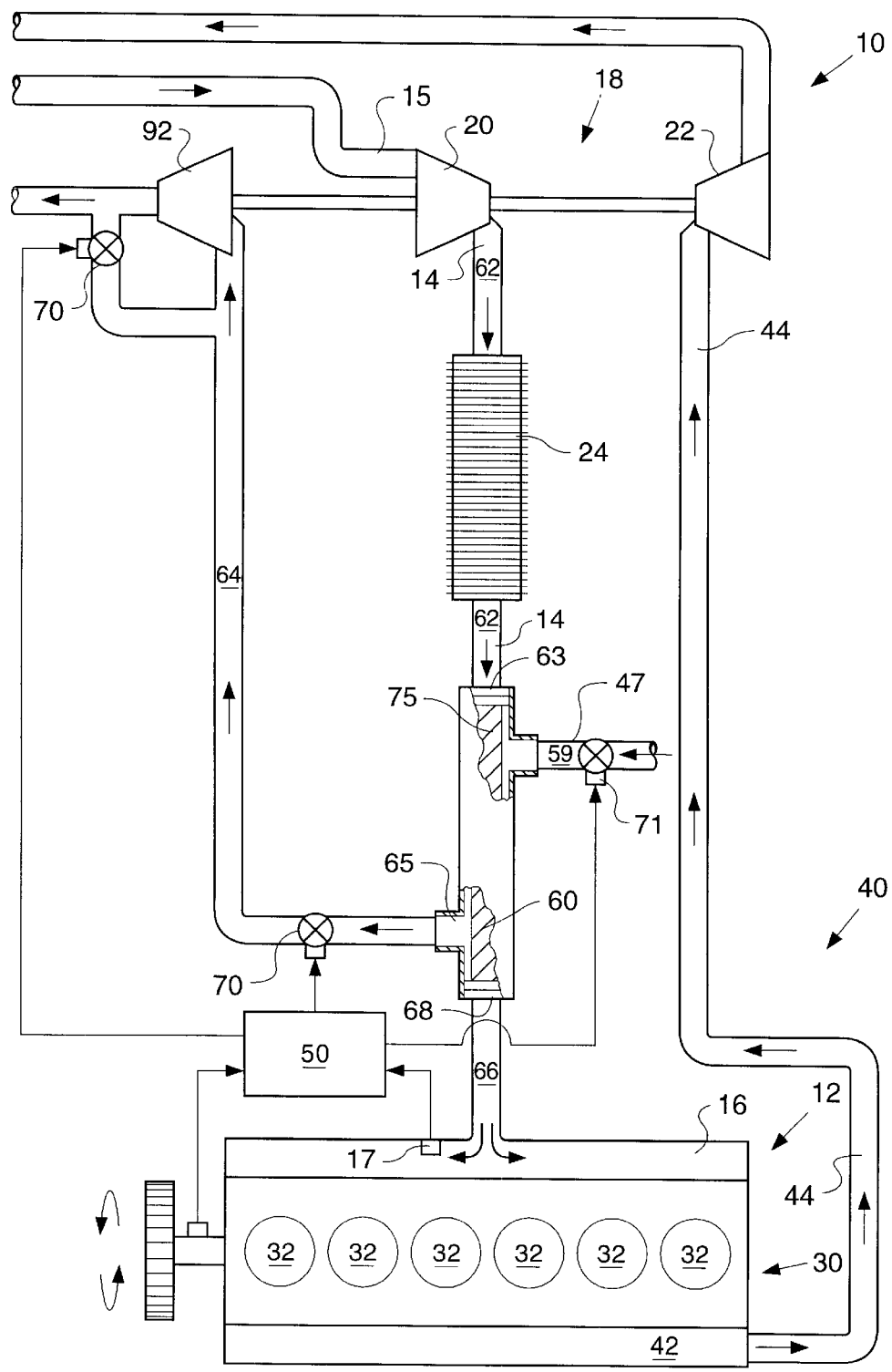

FIG. 5b shows an alternate embodiment of the intake air separation system 10 with a purge air driver 92' disposed downstream of the air separation device 60. In this embodiment, the purge air compressor 92' is likewise associated with the turbocharger 18 that is driven by the exhaust gas driven turbine 22. The purge air compressor 92', however, is disposed in flow communication downstream of the permeate outlet 65 of the air separation device 60 so as to 'pull' the purge air through the air separation device 60.

Each of the above-described embodiments of the intake air separation system 10 also includes a permeate flow proportional valve 70 and a purge air control valve 71. In order to accomplish the oxygen content modulation of the permeate flow 64 (combined oxygen enriched air and purge air) with the retentate flow 66 (nitrogen enriched air), a permeate flow proportional valve 70 or purge air control valve 71 or both are operatively controlled by the engine control module (ECM) 50.

The ECM 50 is thus adapted to control the flow of oxygen enriched air and purge air from the intake air separation device 60 by controlling both the permeate flow proportional valve 70, purge air valve 71, as well as any purge air driver (72,82,92), if used. In doing so, the ECM 50 is effectively controlling the flow to intake manifold 16 by controlling the relative oxygen and nitrogen content in the retentate flow 66 that is directed to the intake manifold 16 of the engine 12. The control of the permeate flow 64 and corresponding retentate flow 66 is preferably done in response to selected engine operating conditions, such as boost conditions, engine speed, engine temperatures, fuel rack (i.e. engine load), as well as other known inputs to the ECM 50.

For example, during selected high load and most transient engine operating conditions, the permeate flow proportional valve 70 is partially or completely closed which disables the air separation effect and re-directs any permeate flow present in or near the separation device to the intake manifold 16 along with the retentate flow 66, which provides a temporary spike in oxygen content to the engine.

By closing the permeate flow proportional valve 70 such that no permeate flow 64 exits the permeate outlet 65, the pressure gradient driving the air separation is in effect eliminated thereby disabling the air separation effect and ultimately increasing the concentration of oxygen reaching the intake manifold 16 for use in the combustion process. In the same manner, partially closing the permeate proportional valve 70 or restricting the permeate flow 64 will affect the pressure gradient between the feed air or intake air flow 62 and the permeate outlet which, in turn affects the overall air separation function and thus alters or controls the oxygen and nitrogen concentration of air to the intake manifold.

As indicated elsewhere, the performance of the intake air separation device is highly dependent on the membrane performance characteristics (e.g. membrane permeability, membrane surface area, and selectivity), membrane configuration, as well as flow patterns of the purge, permeate, and retentate flows within the intake air separation device housing. Various flow arrangements are contemplated including a cross flow orientation where the purge air flow and permeate flow (oxygen enriched air flow) exits are oriented in a generally orthogonal relation to the intake air or feed air intake as well as the retentate flow (nitrogen enriched air flow) exit. Alternative flow patterns are contemplated for use with the present embodiments including a counter flow arrangement where the permeate and retentate flows are oriented in the generally opposite direction, or a parallel flow orientation where the permeate and retentate flow, as well as the intake air feed and purge air, all flow in generally the same direction, or various combinations thereof.

Industrial Applicability

The preferred operation the above-described intake air separation systems and associated method of controlling such intake air separation systems includes the basic steps of: (a) directing the engine intake air to an intake air separating device; (b) directing a flow of purge air through the intake air separating device; (c) separating the intake air into a flow of oxygen enriched air and a flow of nitrogen enriched air; (d) directing the nitrogen enriched air to the intake manifold; and (e) controlling the nitrogen content of the air directed to the intake manifold by controlling flow of purge air and/or permeate flow in response to selected engine operating conditions.

The step of controlling the nitrogen content and oxygen content of the combustion air is preferably controlled by an ECM 50 through the operation of the purge air control valve 71, which is preferably situated in the purge air flow circuit. In addition, further control of the air separation system 10 can be effected through the supplemental control of a second flow valve 70 disposed at or near the permeate flow outlet 65, and, in part via control of the membrane temperature.

Preferably, the flow of purge air is generally between about 5 percent to 40 percent by volume of intake air flow, and more preferably between about 10 percent to 20 percent by volume of intake air flow. Varying or controlling the amount of purge air affects the overall air separation system performance.

As an illustrative example of intake air separation system control, there exist one set of engine operating conditions where the purge air flow valve and the permeate flow valve are open (i.e. air separation is active), and the natural pressure gradient or created pressure gradient across the membrane separation device is sufficient to create the desired or necessary permeate and retentate flow volumes. On the other hand, there exist another set of engine operating conditions (e.g. transient engine operating conditions) where the purge valve is typically closed and/or the permeate flow valve is partially or completely closed (i.e. intake air separation is limited or totally disabled). In such operating conditions the absence of the purge flow and/or permeate flow restricts or inhibits the air separation function. Through the selective operation of the purge air valve, the concentration of oxygen and nitrogen in the air provided to the intake manifold is actively controlled. Likewise, there are numerous other engine operating conditions where the ECM would modulate the opening and closing of the purge air valve and/or permeate flow valve to obtain the desired retentate flow to the intake manifold for the engine. The cooperative control of such valves provides numerous control strategies suitable for use with the disclosed air intake separation systems, particularly where other uses of the retentate and permeate flows are contemplated.

Under any of the above-described engine operating conditions, the ECM effectively controls the devices that govern the flows through the system, including the variable geometry turbocharger and purge air driver, if such devices are used, and the proportional permeate valve, as well as any bypass valves and other auxiliary devices useful in such intake air separation system. Such devices, including the VGT and proportional permeate valve are preferably controlled by the ECM in response to certain measured or otherwise ascertained parameters such as intake and exhaust temperatures, mass air flow rates, oxygen concentrations, NOx levels, intake and exhaust pressures, engine speed and engine load.

From the foregoing, it can be seen that the disclosed invention is an intake air separation system for an internal combustion engine, such as a heavy-duty diesel engine, that includes an intake air separation device adapted to receive the intake air flow and separate the same into flows of oxygen enriched air and nitrogen enriched air. The intake air separation system also includes a purge air flow, the control of which is used for controlling the resulting concentration of oxygen and nitrogen directed to the intake manifold. While the invention herein disclosed has been described by means of specific embodiments and processes associated therewith, numerous modifications and variations could be made thereto by those skilled in the art without departing from the scope of the invention as set forth in the claims.

What is claimed is:

1. An intake air separation system adapted for providing nitrogen enriched air for a combustion process within an internal combustion engine, said intake air separation system comprising:

an intake air inlet adapted to receive said intake air used in said combustion process for said engine;

an intake air separation device in flow communication with said intake air inlet and adapted for receiving said intake air and separating said intake air into a flow of said oxygen enriched air and a flow of nitrogen enriched air;

a purge air circuit in fluid communication with said intake air separation device and adapted for providing a source of purge air to said intake air separation device to increase efficiency of intake air separation;

a permeate outlet in fluid communication with said intake air separation device and adapted to receive said flow of said oxygen enriched air and said purge flow; and a retentate outlet in fluid communication with said intake air separation device and said intake manifold, said retentate outlet adapted to provide said flow of said nitrogen enriched air to said intake manifold for use in said combustion process.

2. The intake air separation system of claim 1 wherein said purge air circuit is further coupled to an intake air circuit of said engine and said source of purge air delivered to said intake air separation device is a portion of said intake air.

3. The intake air separation system of claim 1 wherein said intake air separation system further comprises:

a first flow control device disposed in said purge air circuit, said flow control device adapted for controlling said flow of purge air in said purge air circuit;

an engine control module operatively coupled to said flow control device and adapted to control said flow of purge air to said intake air separation device via said purge air circuit and corresponding flows of nitrogen enriched air and oxygen enriched air via said retentate and permeate outlets in response to selected engine operating conditions;

wherein nitrogen content of said air provided to said intake manifold for use in said combustion process is varied in response to selected engine operating conditions.

4. The intake air separation system of claim 1 wherein said intake air separation device is disposed downstream of an intake air pressure-charging device.

5. The intake air separation system of claim 4 wherein said purge air circuit is further coupled to an intake air circuit downstream of an intake air pressure-charging device and said source of purge air delivered to said intake air separation device is a portion of said pressurized intake air.

6. The intake air separation system of claim 1 wherein said intake air separation device is disposed downstream of an intake air-cooling device.

7. The intake air separation system of claim 1 wherein said intake air separation device further comprises a selectively permeable membrane device.

8. The intake air separation system of claim 1 wherein said intake air separation system further includes a purge air driver disposed in said purge air circuit and adapted for forcibly directing said purge flow through said intake air separation device.

9. The intake air separation system of claim 8 wherein said purge air driver is disposed in fluid communication with said air separation device and mechanically driven by power output of said engine.

10. The intake air separation system of claim 8 wherein said purge air driver is disposed in fluid communication with said purge air circuit and driven by an exhaust gas driven turbine of said engine.

11. The intake air separation system of claim 1 wherein said intake air separation system further includes a purge air driver in fluid communication with and downstream of said intake air separation device, said purge air driver adapted for forcibly directing said purge flow and said flow of oxygen enriched air from said air separation device via said permeate outlet.

12. The intake air separation system of claim 11 wherein said purge air driver is a venturi element placed in fluid communication with said permeate outlet, wherein said flow of oxygen enriched air and purge air is forcibly drawn to said venturi element via said permeate outlet.

13. The intake air separation system of claim 11 wherein said purge air driver is disposed in fluid communication with said air separation device and mechanically driven by power output of said engine.

14. The intake air separation system of claim 11 wherein said purge air driver is disposed in fluid communication with said purge air circuit and driven by an exhaust gas driven turbine of said engine.

15. The intake air separation system of claim 1 further comprising a heat exchanger disposed in said purge air circuit adapted to cool a flow of purge air upstream of said intake air separation device.

16. A method of controlling an intake airflow in an internal combustion engine, said engine having an intake air system adapted for providing intake air to an intake manifold and one or more combustion chambers, said method comprising the steps of:

directing said intake air to an intake air separating device;

directing a flow of purge air through said intake air separating device;

separating said intake air into a flow of oxygen enriched air and a flow of nitrogen enriched air;

directing said nitrogen enriched air to said intake manifold; and controlling nitrogen content of said air directed to said intake manifold by controlling flow of said purge air in response to selected engine operating conditions.

17. The method of claim 16 wherein the step of separating said intake air into a flow of oxygen enriched air and a flow of nitrogen enriched air further comprises passing said intake air through a selectively permeable membrane adapted for separating said intake air to producing oxygen enriched air at a first outlet and nitrogen enriched air at a second outlet.

18. The method of claim 16 further comprising the step of pressurizing said intake air prior to the step of directing substantially all of said intake air to said intake air separating device.

19. The method of claim 16 further comprising the step of cooling said intake air prior to the step of directing said intake air to said intake air separating device.

20. The method of claim 16 wherein flow of purge air is between about 5 percent to 40 percent by volume of intake air flow.

21. The method of claim 16 wherein flow of purge air is between about 10 percent to 20 percent by volume of intake air flow.

22. The method of claim 16 further comprising the step of pressurizing said purge air prior to the step of directing said purge air to said intake air separating device.

23. The method of claim 16 further comprising the step of cooling a flow of purge air prior to the step of directing said purge air to said intake air separating device.

24. The method of claim 16 wherein the step of controlling nitrogen content of said air directed to said intake manifold by controlling flow of said purge air, further comprises controlling volumetric flow rate of said purge air through said intake air separating device.

25. The method of claim 16 wherein the step of controlling nitrogen content of said air directed to said intake manifold by controlling flow of said purge air, further comprises controlling temperature of said purge air through said intake air separating device.

26. The method of claim 16 wherein the step of directing a flow of purge air to said intake air separating device further comprises diverting a portion of said intake air and directing said diverted flow to said intake air separating device.

* * * * *